(12) United States Patent
Best

(10) Patent No.: US 8,989,238 B2
(45) Date of Patent: Mar. 24, 2015

(54) BI-DIRECTIONAL INTERFACE CIRCUIT HAVING A SWITCHABLE CURRENT-SOURCE BIAS

(75) Inventor: Scott C. Best, Palo Alto, CA (US)

(73) Assignee: Rambus Inc., Los Altos, CA (US)

( * ) Notice: Subject to any disclaimer, the term of this patent is extended or adjusted under 35 U.S.C. 154(b) by 947 days.

(21) Appl. No.: 12/527,005

(22) PCT Filed: Feb. 28, 2008

(86) PCT No.: PCT/US2008/055270
§ 371 (c)(1),
(2), (4) Date: Feb. 4, 2010

(87) PCT Pub. No.: WO2008/109329
PCT Pub. Date: Sep. 12, 2008

(65) Prior Publication Data
US 2010/0135370 A1    Jun. 3, 2010

Related U.S. Application Data

(60) Provisional application No. 60/904,586, filed on Mar. 2, 2007, provisional application No. 60/905,458, filed on Mar. 6, 2007.

(51) Int. Cl.
*H04B 1/38*        (2006.01)
*H04L 25/02*       (2006.01)
(Continued)

(52) U.S. Cl.
CPC ........ *H04L 25/0264* (2013.01); *G06F 13/4072* (2013.01); *H04L 5/1469* (2013.01); *H04L 5/16* (2013.01)
USPC .......................................... 375/219; 375/295

(58) Field of Classification Search
USPC .................................................. 375/219, 295
See application file for complete search history.

(56) References Cited

U.S. PATENT DOCUMENTS 5,196,733 A * 3/1993 Shin ............................... 327/379
5,635,745 A * 6/1997 Hoeld ............................ 257/372
(Continued)

FOREIGN PATENT DOCUMENTS

| EP | 1050824 A2 | 11/2000 |
|---|---|---|
| EP | 1050824 A3 | 1/2004 |
| JP | 2000138575 A | 5/2000 |

OTHER PUBLICATIONS

Notification Concerning Transmittal of International Preliminary Report on Patentability for Application No. PCT/US2008/055270, mailed Sep. 17, 2009, Includes Written Opinion of the Int'l. Searching Authority, 9 pages.

(Continued)

*Primary Examiner* — Michael Neff
(74) *Attorney, Agent, or Firm* — Lowenstein Sandler LLP

(57) ABSTRACT

A bi-directional interface circuit includes a transmitter portion, a receiver portion, a current source bias circuit, and a switch. When the interface circuit is transmitting data, the switch steers the bias current generated by the current source bias circuit to the transmitter portion of the interface. When the interface is receiving data, the switch steers the bias current to the receiver portion of the interface. Thus, the current-source bias circuit is kept on regardless of whether the interface is transmitting or receiving data. Because the current-source bias circuit is not turned on and off, the switching noise generated when the interface transitions between transmitting and receiving operations is eliminated or reduced. Consequently, any dead time inserted for such a transition can be minimized, and the effective bandwidth of the interface is increased.

20 Claims, 5 Drawing Sheets

(51) Int. Cl.
*G06F 13/40* (2006.01)
*H04L 5/14* (2006.01)
*H04L 5/16* (2006.01)

(56) References Cited

U.S. PATENT DOCUMENTS

| | | | |
|---|---|---|---|
| 6,665,339 B1 * | 12/2003 | Adams et al. | 375/238 |
| 6,980,786 B1 * | 12/2005 | Groe | 455/314 |
| 7,502,278 B1 * | 3/2009 | Imbornone et al. | 367/103 |
| 2003/0076771 A1 * | 4/2003 | Lin et al. | 369/124.11 |
| 2003/0154316 A1 * | 8/2003 | Konz et al. | 709/253 |
| 2007/0001754 A1 * | 1/2007 | Lakdawala et al. | 327/552 |
| 2007/0121389 A1 * | 5/2007 | Wu et al. | 365/189.05 |

OTHER PUBLICATIONS

EP Office Action with mail date of Dec. 21, 2009, re EP Application No. 08730945.6, 2 pages.

EP Office Action with mail date of Feb. 18, 2010 re EP 08730945.6-2411. 3 Pages.

EP Response dated Jun. 14, 2010 to the Official Communication dated Feb. 18, 2010 re EP Application No. 08730945.6, includes New Claims both highlighted and clear copies. 12 Pages.

* cited by examiner

BI-DIRECTIONAL INTERFACE CIRCUIT HAVING A SWITCHABLE CURRENT-SOURCE BIAS

BACKGROUND

The present disclosure relates in general to data communication between integrated circuits and more particularly to a bi-directional interface circuit having switchable current-source bias.

One common method of transferring data between semiconductor chips is referred to as single-ended signaling, in which an entire data signal may be transmitted via a single wire between two interfaces, one on each of two chips. By driving the voltage on this wire either high or low relative to a reference voltage, digital data is transmitted. Although single-ended signaling is relatively simple to implement, it is susceptible to interference and noise. Typically, a number of wires are connected in parallel in order to transmit multiple bits of data simultaneously between semiconductor chips and between various electrical devices. Consequently, data being transmitted over a specific wire can produce "crosstalk" interference with data being transmitted on other wires. Electromagnetic interference (EMI) can also cause data to become corrupted in single-ended systems. Furthermore, each time the signal transitions from a high voltage to a low voltage and vice versa, a small amount of noise is generated on the transmitting chip's internal power supply grid. In some systems with upwards of thirty-two or more wires acting in parallel on an electrical bus interconnect, continuously transmitting data, this simultaneous switching output (SSO) noise becomes a performance limiting factor. Further complicating matters, the effects of capacitive and inductive parasitics inherent to the electrical interconnect limit the rate or "frequency" by which data can be transmitted across that interconnect. Beyond a certain frequency, the signal becomes attenuated (e.g., weaker), which makes the signal even more susceptible to becoming corrupted by interference and noise.

In response to these and other issues associated with the single-ended signaling at high data rates, designers typically utilize differential signaling for high performance applications. With differential signaling, a pair of wires is used to carry an electrical signal. Unlike in single-ended signaling, in which the binary "one" and "zero" information is communicated with voltages relative to fixed DC references (such as the circuits power supply voltages, commonly called "VDD" and "ground"), in differential signaling it is the difference of the voltages on the wires themselves which conveys the information—e.g., when the voltage on a "positive" side of the pair of wires is larger than a "negative" side, a logical "one" is being transmitted; when the "negative" side has a higher electrical potential than the "positive" side, a logical "zero" is being transmitted. As a result of differential signaling, much of the interference and noise created by the signaling is experienced by both wires, and so is effectively cancelled out. Thus, differential signaling has the benefit of greatly reducing the effects from most sources of common-mode interference and noise. Consequently, data can be more easily transmitted at very high data rates using a differential signaling scheme. This benefit does of course not come for free: differential signaling schemes implicitly require twice as many wires and pins to carry the same number of signals as compared to single-ended signaling schemes.

In some applications in which device pin count is an important economic metric, such as in very high performance memory interconnect, a differential signal pair is used "bi-directionally"; that is, the same pair wires are used for transmitting data in both directions. For example, in a high performance memory system including a memory chip and a memory controller, during a read operation, the memory chip transmits data over the differential pair of wires to the memory controller. During a write operation, on the other hand, the memory controller transmits data over the same differential pair of wires to the memory controller. The memory controller is typically responsible for handling the command and control signals required so that both chips on both sides of the electrical channel use the bi-directionality in concert with each other. For example, when one side of the electrical channel is in a "transmit state", the opposite sides needs to be in a "receive state".

Changing a bi-directional circuit interface from being in a "transmit state" to a "receive state"; however, creates some of the same problems previously known to single-ended signaling. For example, when a differential transmitter is activated (e.g., during the transition from a "receive" state to a "transmit" state), a current-source bias circuit is typically enabled. Turning on such a current-source bias circuit associated with the differential transmitter actually creates on-chip and in-system noise very similar to single-ended noise. Noise is also generated when the current-source bias is turned off (e.g., during the transition from a "transmit" to a "receive" state). And as with single-ended transmission systems, this noise can cause errors in data transmission. In order to prevent this type of errors from occurring, one solution has been to deliberately introduce bus-turnaround delays or "bubbles" immediately following transmit and receive state transitions. During the delay, no data is transmitted over the differential interconnect. This gives time for the noise (generated due to state transition) to eventually settle out. Although these delays maintain data integrity, they decrease the transmit efficiency because data is not being transmitted during these delays. For very high data rates, the "dead time" imposed by these bus-turnaround delays translates into diminished utilization of the available bandwidth. Thus, bi-directional differential signaling has yet to reach its fullest potential.

BRIEF DESCRIPTION OF THE DRAWINGS

The accompanying drawings, which are incorporated in and form a part of this specification, illustrate embodiments discussed below, and, together with the description, serve to explain the principles of the disclosure.

DETAILED DESCRIPTION

Embodiments in the present disclosure pertains to a bi-directional interface circuit having a switchable current-source bias circuit. The interface transmits as well as receives data over a differential, bi-directional transmission medium. The current-source bias circuit is coupled to both a transmitter portion and a receiver portion of this interface. When transmitting data, a current switch circuit steers a bias current generated by the bias current source to the transmitter portion including, for example, a differential amplifier. When receiving data, the switch steers the bias current source to a receiver portion including, for example, a pre-amplifier. Thus, the current-source bias is kept on regardless of whether the interface is transmitting or receiving data. Because the current-source bias is not turned on and off, it introduces little to no noise on a power bus when the interface switches between transmit and receive modes of operation. Consequently, any "timing bubble" inserted when transitioning between transmitting and receiving data and vice versa, can be minimized and an effective bandwidth of the interface is increased. In some embodiments, there is no need to artificially insert bus-turnaround timing delays in order to allow noise events to "settle out" when transitioning between transmit and receive modes of operation.

Figure 1:
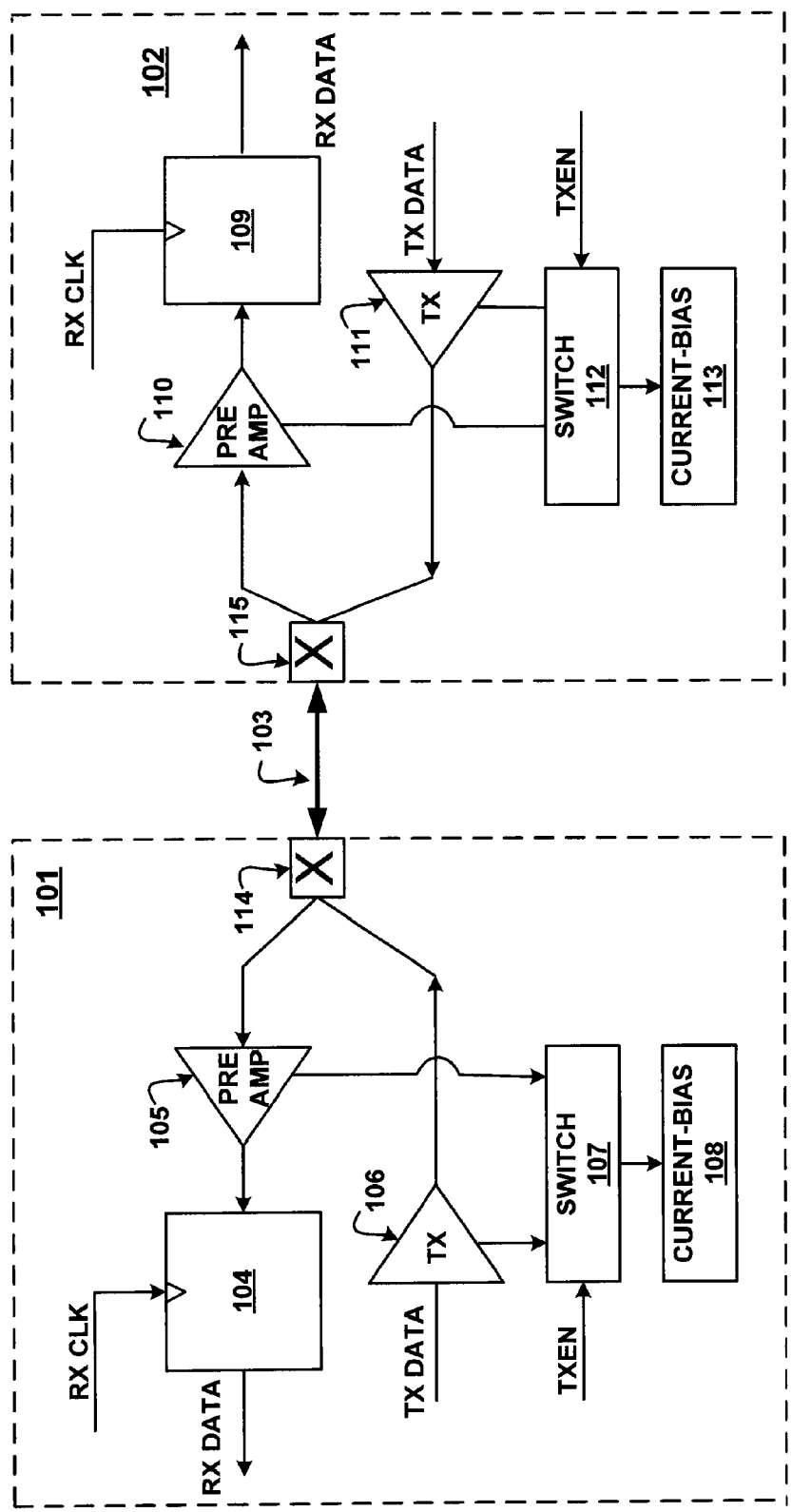
FIG. 1 shows a block diagram of a bi-directional, differential transceiver system which utilizes a switchable current-source bias for its bi-directional circuit interfaces.

The elimination or reduction in switching noise may possibly be accomplished by keeping the current source bias active during the receive mode of operation but routing the current generated therefrom into a power supply network. This provides noise-avoidance benefit, but has the drawback of burning unnecessary power. Embodiments of the present disclosure avoids such drawback by routing the bias current to where it can be used in a receive circuit during and/or after the transceiver transitions to a receive mode of operation from a transmit mode of operation, in which the current-source bias is used to power up the differential amplifier used to transmit data over the differential pair of wires. In the receive mode of operation, for example, the current can be routed to be used in a circuit in the receiver portion (including, but not limited to, a pre-amplifier circuit or a linear equalizer circuit) which receives or processes the received data. Thus, in addition to the reduction in switching noise, embodiments of the present disclosure also provide further benefit by increasing the utilization of the current-source bias circuit FIG. 1 shows a block diagram of a bi-directional, differential transceiver system which utilizes switchable current-source bias for its bi-directional circuit interfaces. Two transceivers 101 and 102 are communicatively coupled by transmission medium 103. Each of the transceivers 101 and 102 has both transmitter and receiver circuitry. In other words, they can transmit as well as receive data. One or more transceivers can exist within a semiconductor chip, electronic assembly, or electrical device. Transmission medium 103 includes at least one differential pair of wires. These wires can be conductive pathways or traces used in conducting signals in a printed circuit board, twisted pairs of copper wires, lines internal to a semiconductor chip, or any other type of conductive material(s) used to convey electronic signals (both analog and/or digital). Transmission medium 103 is bi-directional in that it can convey signals in both directions; electronic data can be transmitted from transceiver 101 and received at transceiver 102, and vice versa.

Transceiver 101 includes an input sampler 104, pre-amplifier 105, transmitter 106, switch 107, and current source bias circuit 108. Transceiver 101 interfaces to the transmission medium 103 via an IC package interface (commonly referred to as "pins" or "bumps") 114. Likewise, transceiver 102 includes an input sampler 109, pre-amplifier 110, transmitter 111, switch 112, and current source bias circuit 113. Transceiver 102 interfaces to the transmission medium 103 via an IC package interface 115. Although transceivers 101 and 102 are shown to be identical in FIG. 1, they need not have the exact same design or circuitry. For example, input sampler 104 need not be the exact same circuit as that of input sampler 109. The same holds true for pre-amplifiers 105 and 110; transmitters 106 and 111, switches 107 and 112, and current-bias circuits 108 and 113. Moreover, significant performance improvements can be achieved if just one of the two transceivers (e.g., either transceiver 101 or 102) implements the techniques in the present disclosure while the other transceiver is a plain prior art transceiver.

When transceiver 101 is transmitting data over medium 103 and transceiver 102 is receiving the data, a transmit enable signal (TXEN) at transceiver 101 causes switch 107 to route a bias current generated by the current-bias circuit 108 to transmitter 106. The data to be transmitted (TX Data) is then driven by transmitter 106 through pins 114 over transmission medium 103 to the pins 115 of transceiver 102. As transceiver 102 is receiving data, its TXEN signal is disabled. This causes switch 112 to route the bias current generated by the current-bias circuit 113 to pre-amplifier 110. Pre-amplifier 110 performs signal processing on the incoming data signal on pins 115 before being sampled by input sampler 109. The received data (RX Data) is clocked out to subsequent circuitry (not shown) according to an RX Clk signal of transceiver 102.

Conversely, when transceiver 102 is transmitting data over medium 103 and transceiver 101 is receiving the data, a transmit enable signal (TXEN) at transceiver 102 causes switch 112 to route the bias current generated by current-bias circuit 113 to transmitter 111. The data to be transmitted (TX Data) is then driven by transmitter 111 through pins 115 over the same transmission medium 103 to the pins 114 of transceiver 101. As transceiver 101 is receiving data, its TXEN signal is disabled. This causes switch 107 to route the bias current generated by current-bias circuit 108 to pre-amplifier 105. Pre-amplifier 105 performs signal processing on the incoming data signal on pins 114 before being sampled by input sampler 104. The received data (RX Data) is clocked out to the subsequent circuitry (not shown) according to an RX Clk signal of transceiver 101.

Consequently, the current-source bias circuit 108 is kept on regardless of whether transceiver 101 is transmitting data or receiving data. The generated bias current is routed to the transmitter portion of the transceiver when the transceiver is in a transmit mode and to the receiver portion of the transceiver when the transceiver is in a receive mode. Likewise, the current-source bias circuit 113 may be kept on regardless of whether transceiver 102 is in transmit or receive mode. By keeping the current-source bias circuit on at all times and "steering" the bias current via switch 107 (and 112), which may be an analog switch, any noise previously associated with turning the current-source ON/OFF and OFF/ON is eliminated. The elimination of the switching noise allows the elimination or reduction of "dead times" or "bubble times" between transmit and receive modes of operation because there is less or no need to allow any transient noise on the power bus to settle out. In turn, this increases the overall bandwidth utilization of the system.

Figure 2:
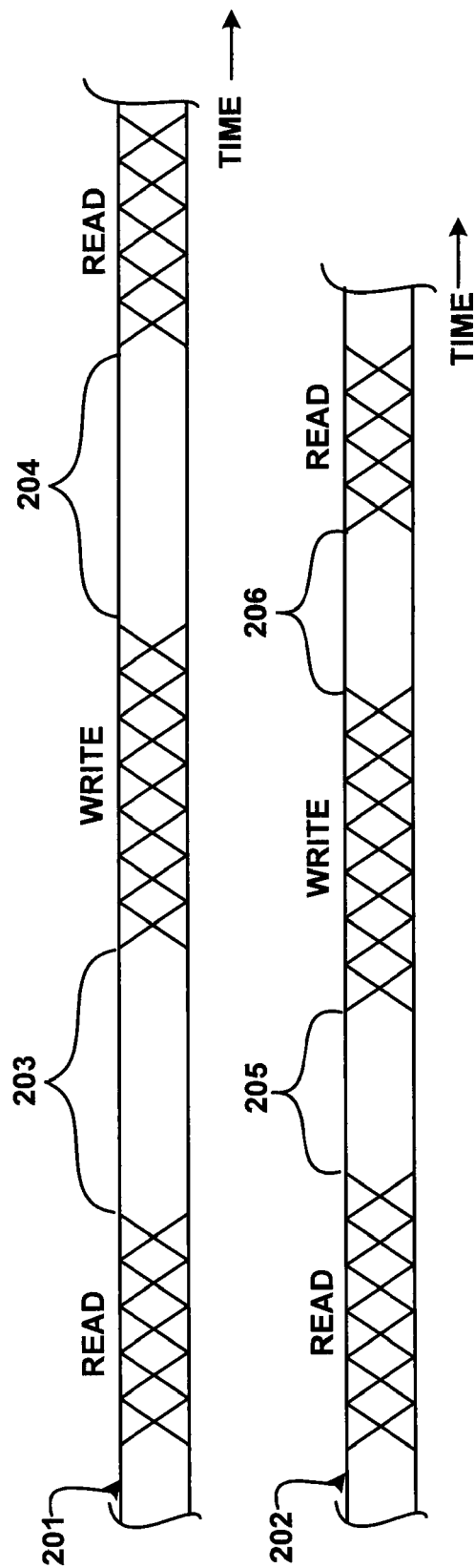
FIG. 2 is a timing diagram illustrating increased bandwidth utilization of the data bus due to shorter dead times.

FIG. 2 is a timing diagram which shows how having shorter dead times increases the bandwidth utilization of the system. Timeline 201 is comprised of first READ, WRITE, and second READ operations. In between the first READ operation and the WRITE operation, there is a "timing bubble" 203 (a.k.a., a "bus-turnaround delay"). As explained above, the "timing bubble" 203 is implemented in order to allow any noise or transient disturbances associated with transmit-to-receive or receive-to-transmit state transition to settle out such that data can be transmitted reliably. Similarly, "timing bubble" 204 is implemented between the WRITE operation and the second READ operation. No data is transmitted during dead times 203 and 204. Timeline 202 has the same amount of data being transmitted in the READ, WRITE, and READ operations as that corresponding to timeline 201, but with shorter dead times 205 and 206. It can be seen that shorter dead times associated with timeline 202 means that the same amount of data can be transacted in a shorter amount of time (i.e., better bandwidth utilization). Clearly, one benefit of shorter dead times, as conferred by the present disclosure, leads to improvements in bandwidth utilization.

Figure 3:
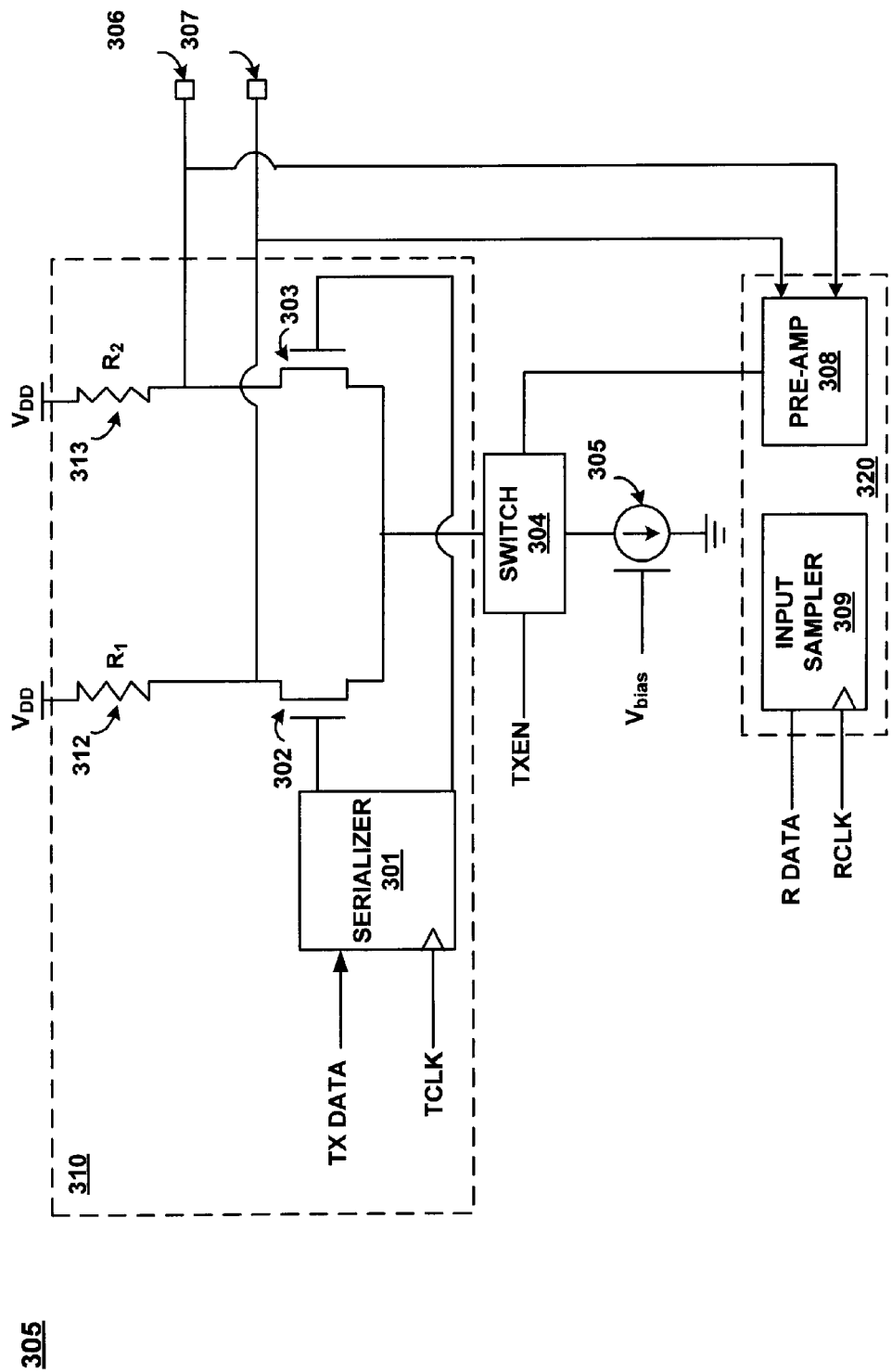
FIG. 3 is a detailed schematic of one embodiment of a transceiver having a current-bias which can be routed between a transmitter portion and a receiver portion, depending on its mode of operation.

FIG. 3 is a detailed schematic of one embodiment of a transceiver having a current-bias circuit 305 whose output bias current can be routed between a transmitter portion 310 and a receiver portion 320, depending on its mode of operation. The transmitter portion includes a serializer 301 followed by a differential amplifier, which, in this embodiment, includes transistors 302 and 303 and termination resistors 312 and 313. Serializer 301 takes the TXData and converts it into a bit stream suitable for transmission over a serial transmission medium. Serializer 301 outputs two complementary signals which are coupled as inputs to the gate terminals of transistors 302 and 303. The drain terminal of transistors 302 and 303 are coupled to output nodes or pads 306 and 307, which are terminated by the two termination resistors, R1 and R2, which are coupled in parallel to the supply voltage $V_{DD}$. The source terminal of transistors 302 and 303 are coupled together and to an analog switch 304. In one embodiment, switch 304 is an analog multiplexer. During a transmit mode of operation, switch 304 routes the output current from bias circuit 305 to the differential amplifier. The data is then transmitted over the differential pair of pins 306 and 307.

When the transceiver operates as a receiver, the received differential signals on pins 306 and 307 are processed by pre-amplifier 308. Pre-amplifier 308 performs functions such as adding gain, noise isolation, and/or linear equalization. During a receive mode of operation, switch 304 routes the bias current from bias circuit 305 such that it biases pre-amplifier 308, which processes the differential input signal received on pins 306 and 307. After signal processing is performed by pre-amplifier 308, the signal is provided to the input sampler 309. The received data is then clocked out as RData to be used by other circuitry coupled to the transceiver.

Figure 4:
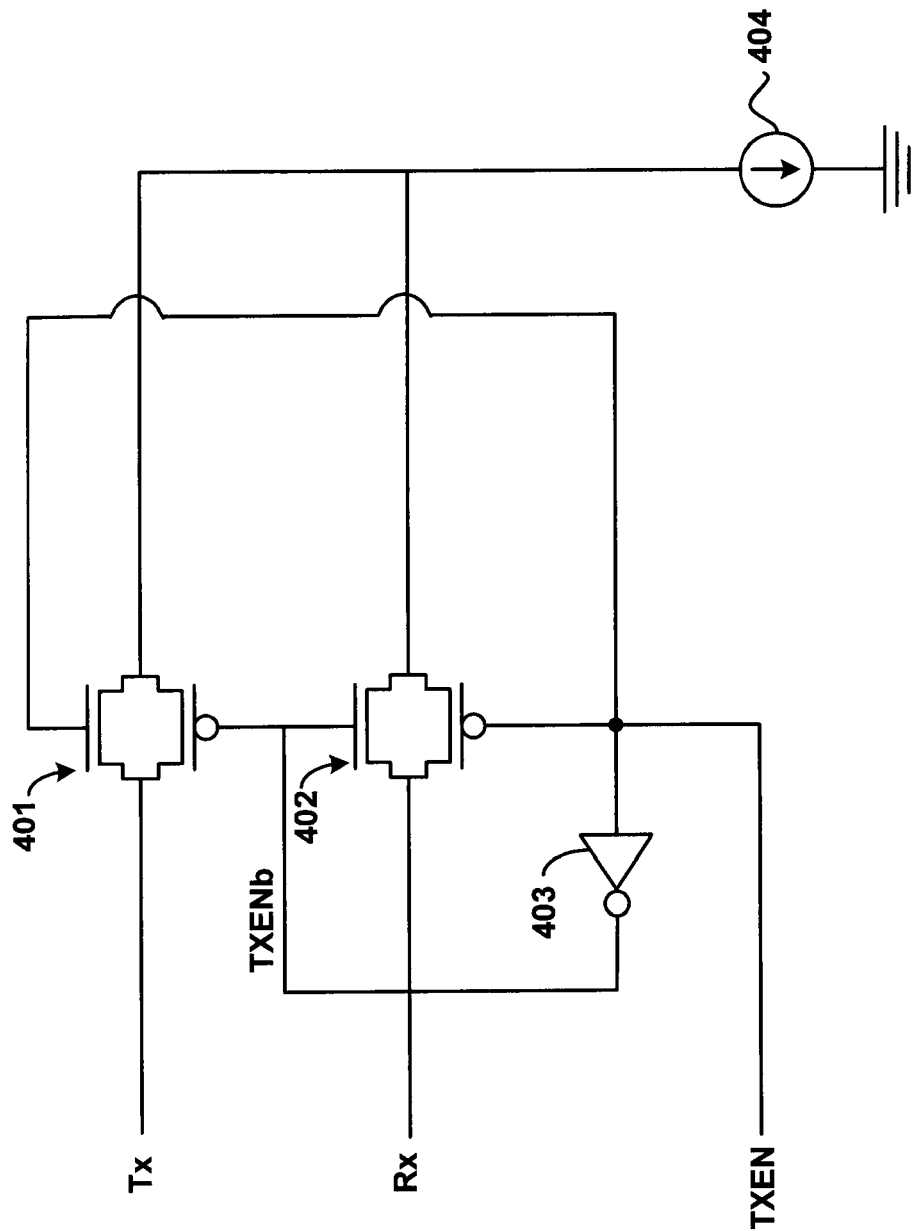
FIG. 4 shows one embodiment of a switch which can be used to route a current-source to either a transmitter portion or to a receiver portion of a transceiver.

FIG. 4 shows one embodiment of a switch which can be used as an "analog multiplexer" to route a current-source bias current to either a transmitter portion or to a receiver portion of a transceiver. The switch is comprised of two transmission gates (also commonly referred to as pass gates) 401 and 402. In this embodiment of an analog multiplexer, each of the transmission gates is comprised of an NMOS transistor coupled in parallel with a PMOS transistor. One end of the transmission gate 401 is coupled to the transmitter portion. The other end of transmission gate 401 is coupled to current-source 404. Consequently, transmission gate 401 selectively connects the current-source 404 to the transmitter portion (Tx). A transmit enable signal (TXEN) and its complement TXENb (generated by inverter 403) are used to control transmission gate 401. The TXEN signal is coupled to the gate of the NMOS transistor of transmission gate 401 while the output from inverter 403 is coupled to the gate of PMOS transistor of transmission gate 401. When the TXEN signal is active, it causes transmission gate 401 to become a conductive path from the transmitter circuit to the current bias circuit. Conversely, when the TXEN signal is not active, it turns off transmission gate 401. This electrically isolates the transmitter portion from current-source 404.

In similar fashion, one end of transmission gate 402 is coupled to the receiver portion (Rx) of the transceiver, while its other end is coupled to the current-source 404. Consequently, transmission gate 402 selectively connects the current-source bias circuit 404 to the receiver portion (Rx). The same TXEN signal for controlling transmission gate 401 is also used to control transmission gate 402. More specifically, the TXEN signal is coupled to the gate of the PMOS transistor of transmission gate 402 while the output from inverter 403 is coupled to the gate of the NMOS transistor of transmission gate 402. When the TXEN signal is active, it causes the transmission gate 402 to stop conducting; current-source 404 is electrically isolated from the receiver portion (Rx). But when the TXEN signal is not active (i.e., when the TXEN signal is "logic low"), transmission gate 402 becomes a conductive path and effectively establishes an electrical connection between the receiver portion and current-source 404. Thus, the TXEN signal controls whether the current associated with current-source 404 is routed to flow through the transmitter or the receiver portion. It should be noted that many other circuit designs can be used to selectively route the current output of bias circuit 404.

Figure 5:
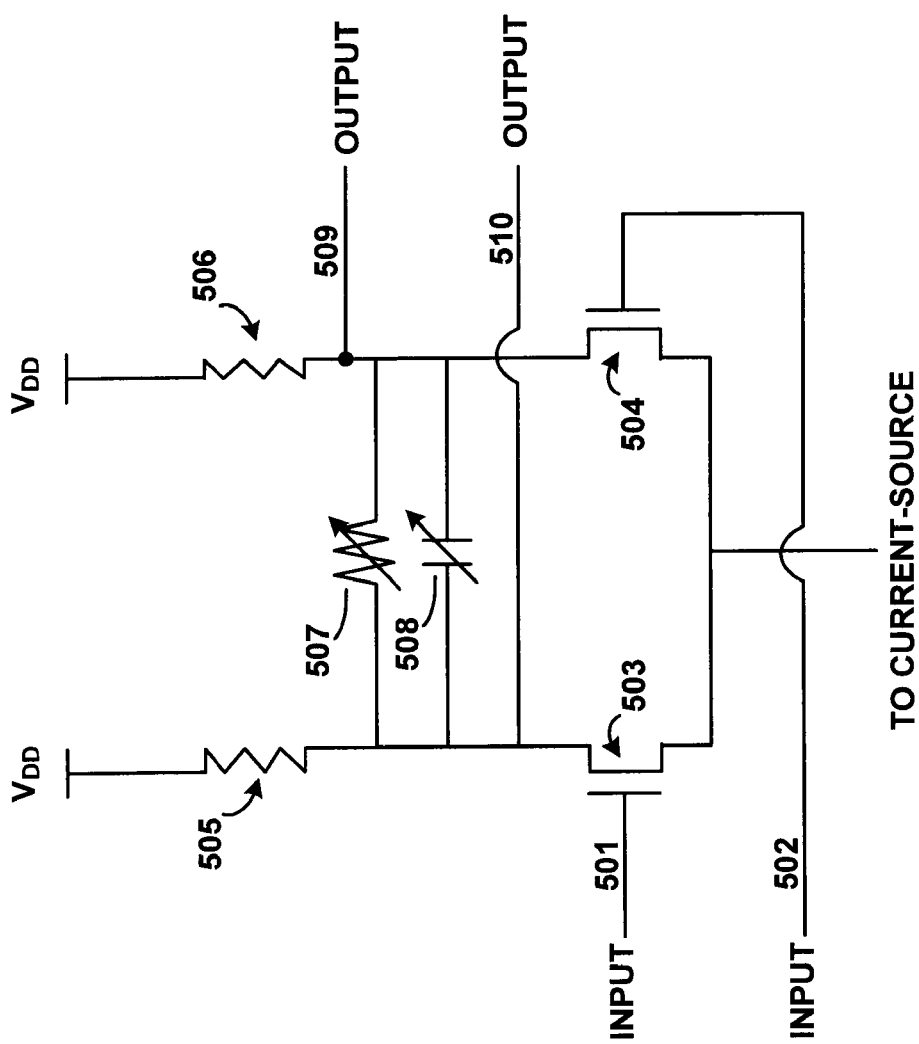
FIG. 5 shows one embodiment of a pre-amplifier which is included as part of the receiver portion of a transceiver.

FIG. 5 shows one embodiment of a pre-amplifier which may be included as part of the receiver portion of a transceiver. A differential signal is input to the pre-amplifier on lines 501 and 502. Line 501 is coupled to the gate of transistor 503. Line 502 is coupled to the gate of transistor 504. The drain terminals of transistors 503 and 504 are coupled to the output and to load resistors 505 and 506 which each have a second terminal attached to the power supply VDD. The source terminal of transistors 503 and 504 are coupled together and coupled to the current-source bias circuit (not shown). This is the same current-source which is switched between the transmitter and receiver portions as described above. A variable or tunable resistor (e.g., potentiometer) 507 is coupled across the drain terminals of transistors 503 and 504. Likewise, a variable or tunable capacitor 508 (e.g., varactor) is coupled across the drain terminals of transistors 503 and 504. By adjusting the resistance and capacitance of variable resistor 507 and variable capacitor 508, the frequency response and gain characteristics of the pre-amplifier can be controlled. The differential signal from the pre-amplifier is output over lines 509 and 510. It should be noted that there are many other different circuit designs for pre-amplifiers, all of which would work with the present disclosure.

In conclusion, a switchable current-source bias for bi-directional circuit interfaces is disclosed. In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A transceiver comprising:
   a transmitter circuit to transmit data over a transmission medium;
   a receiver circuit to receive data from the transmission medium;
   a current-source bias circuit to output a bias current; and
   a switch circuit coupled to the transmitter circuit, the current-source bias circuit, and the receiver circuit, the switch circuit to selectively route the bias current from the current source bias circuit to the transmitter circuit when the transmitter circuit is transmitting data over the transmission medium and the switch circuit to selectively route the bias current from the current source bias circuit to the receiver circuit when the receiver circuit is receiving data from the transmission medium.

2. The transceiver of claim 1, wherein when the transceiver is transmitting data, the switch circuit establishes an electrical connection between the current-source bias circuit and a differential amplifier in the transmitter circuit.

3. The transceiver of claim 2, wherein when the transceiver is receiving data, the switch circuit disconnects the current-source bias circuit from the transmitter and establishes an electrical connection between the current-source bias circuit and a pre-amplifier in the receiver circuit.

4. The transceiver of claim 1, wherein the current-source bias circuit is kept active during both a transmit mode of operation of the transceiver and a receive mode of operation of the transceiver.

5. The transceiver of claim 1, wherein the transceiver resides within a memory device.

6. The transceiver of claim 1, wherein the transceiver resides within a memory controller.

7. The transceiver of claim 1, wherein the switch includes transmission gates that are controlled by a transmit enable signal.

8. The transceiver of claim 3 wherein the receiver circuit further comprises an input sampler coupled to the pre-amplifier.

9. The transceiver of claim 8, wherein the pre-amplifier comprises a differential amplifier, a variable resistor, and a variable capacitor which are used to configure characteristics of the pre-amplifier.

10. A method of transmitting and receiving a differential signal over a bidirectional transmission medium, comprising:
generating a bias current by a current-source bias circuit;
while the bias current from the current-source bias circuit is selectively routed to a transmitter circuit, transmitting an outgoing differential signal over the bi-directional transmission medium using the transmitter circuit; and
while the bias current from the current-source bias circuit is selectively routed to a receiver circuit, receiving an incoming differential signal from the bi-directional transmission medium using the receiver circuit.

11. The method of claim 10 further comprising:
performing signal processing on the incoming differential signal utilizing the bias current.

12. The method of claim 10 wherein the bias current is kept on during the transmitting and the receiving.

13. The method of claim 10, further comprising minimizing a dead time between transmitting data and receiving data by keeping the bias current on during and between the transmitting and the receiving.

14. The method of claim 10 further comprising:
generating a transmit enable signal to selectively route the bias current to the transmitter circuit during the transmitting and to the receiver circuit during the receiving.

15. A bi-directional interface circuit comprising:
a transmitter portion to transmit an outgoing differential signal over a pair of wires;
a receiver portion to receive an incoming differential signal from the pair of wires;
a current-source to generate a bias current;
a switch to selectively route the bias current from the current-source to one of the transmitter portion and the receiver portion depending on whether the bi-directional interface circuit is transmitting data over the pair of wires or receiving data from the pair of wires.

16. The bi-directional circuit interface of claim 15, wherein the current-source is kept on when the interface circuit transitions between transmitting data and receiving data.

17. The bi-directional circuit interface of claim 15, wherein the receiver portion comprises a pre-amplifier and the pre-amplifier utilizes the bias current from the current-source when receiving the incoming differential signal.

18. The bi-directional circuit interface of claim 15, wherein the switch comprises a plurality of pass gates controlled by a transmit enable signal.

19. The bi-directional circuit interface of claim 15, wherein the switch comprises a analog multiplexer.

20. An apparatus comprising:
a memory chip to store digital data;
a memory controller to write data to the memory chip and read data from the memory chip;
a bi-directional differential bus coupling the memory chip to the memory controller;
wherein at least one of the memory chip and the memory controller comprises a transmitter coupled to the bus, a receiver coupled to the bus, a current-source bias circuit to generate a bias current, and a switch to selectively route the bias current from the current-source bias circuit to the transmitter when the transmitter is transmitting data over the bus and the switch to selectively route the bias current from the current-source bias circuit to the receiver when the receiver is receiving data from the bus.

* * * * *